(12) United States Patent
Mašnauskas et al.

(10) Patent No.: US 12,052,173 B2
(45) Date of Patent: Jul. 30, 2024

(54) EXECUTING WORKLOADS ACROSS MULTIPLE CLOUD SERVICE PROVIDERS

(71) Applicant: CAST AI Group, Inc., North Miami Beach, FL (US)

(72) Inventors: Saulius Mašnauskas, Vilnius (LT); Rokas Bilevičius, Vilnius (LT); Tadeuš Varnas, Vilnius (LT); Augustinas Stirbis, Vilnius (LT); Leonid Kuperman, Tarzana, CA (US)

(73) Assignee: CAST AI Group, Inc., North Miami Beach, FL (US)

( * ) Notice: Subject to any disclaimer, the term of this patent is extended or adjusted under 35 U.S.C. 154(b) by 0 days.

(21) Appl. No.: 17/380,732

(22) Filed: Jul. 20, 2021

(65) Prior Publication Data

US 2022/0029917 A1     Jan. 27, 2022

Related U.S. Application Data

(60) Provisional application No. 63/054,978, filed on Jul. 22, 2020.

(51) Int. Cl.
*H04L 45/741*     (2022.01)
*H04L 9/40*     (2022.01)
(Continued)

(52) U.S. Cl.
CPC ........ *H04L 45/741* (2013.01); *H04L 12/4633* (2013.01); *H04L 12/4641* (2013.01); *H04L 63/029* (2013.01); *H04L 67/10* (2013.01)

(58) Field of Classification Search
CPC ............. H04L 45/741; H04L 12/4633; H04L 12/4641; H04L 63/029; H04L 67/10
(Continued)

(56) References Cited

U.S. PATENT DOCUMENTS 10,355,989 B1    7/2019    Panchal et al.
10,484,334 B1 *   11/2019   Lee .......... H04L 67/30
(Continued)

OTHER PUBLICATIONS

United States Office Action, U.S. Appl. No. 17/380,729, filed Dec. 9, 2021, 10 pages.
(Continued)

*Primary Examiner* — Cheikh T Ndiaye
*Assistant Examiner* — Ayele F Woldemariam
(74) *Attorney, Agent, or Firm* — Fenwick & West LLP

(57) ABSTRACT

A multi-cloud service system establishes tunnels and network overlays across multiple CSPs while meeting a criterion for a latency threshold. The system conducts a latency benchmarking evaluation across each cloud region for multiple CSPs and based on the latency bench marking evaluation results, the system may identify a group of cloud regions that satisfy a criterion such as predetermined maximum latency threshold or geographical restriction. The system may provision the group of cloud regions by provisioning a tunnel between nodes of the multiple CSPs. The system further establishes an overlay network on top of the tunnel by encapsulating packets using encapsulation end point such as VTEP (VXLAN tunnel end point) over VXLAN (Virtual Extension Local Area Network), which may help to ensure reliable transmission of packets from pod to pod. The system may inject user data into each node to initiate operations across the provisioned nodes using injected user data.

20 Claims, 14 Drawing Sheets

(51) Int. Cl.
*H04L 12/46* (2006.01)
*H04L 67/10* (2022.01)

(58) Field of Classification Search
USPC .......................................... 370/389
See application file for complete search history.

(56) References Cited

U.S. PATENT DOCUMENTS

| | | | |
|---|---|---|---|
| 11,089,105 | B1 | 8/2021 | Karumbunathan et al. |
| 11,159,366 | B1* | 10/2021 | Gawade .............. H04L 41/0895 |
| 2016/0127454 | A1 | 5/2016 | Maheshwari et al. |
| 2016/0234059 | A1* | 8/2016 | Gu ...................... H04L 12/4633 |
| 2016/0323184 | A1* | 11/2016 | Li ........................... H04L 12/28 |
| 2017/0257439 | A1 | 9/2017 | Wang et al. |
| 2019/0238508 | A1* | 8/2019 | Hira .................... H04L 41/0893 |
| 2019/0319892 | A1* | 10/2019 | Ganguli .................. H04L 47/76 |
| 2019/0356609 | A1* | 11/2019 | Grunwald ............. G06F 16/275 |
| 2020/0099659 | A1 | 3/2020 | Cometto et al. |
| 2020/0177503 | A1* | 6/2020 | Hooda ................ H04L 12/4641 |
| 2020/0278892 | A1* | 9/2020 | Nainar .................... H04L 67/10 |
| 2020/0296026 | A1 | 9/2020 | Michael et al. |
| 2021/0019194 | A1* | 1/2021 | Bahl ..................... G06F 9/3877 |

OTHER PUBLICATIONS

United States Office Action, U.S. Appl. No. 17/380,729, filed Jun. 16, 2022, 11 pages.

* cited by examiner

FIG. 6

EXECUTING WORKLOADS ACROSS MULTIPLE CLOUD SERVICE PROVIDERS

CROSS REFERENCE TO RELATED APPLICATIONS

This application claims the benefit of U.S. Provisional Application No. 63/054,978, filed Jul. 22, 2020, the disclosure of which is hereby incorporated by reference herein in its entirety.

TECHNICAL FIELD

The disclosure generally relates to the field of cloud resources, and more particularly relates to executing workloads across multiple cloud service providers (CSPs).

BACKGROUND

Many CSPs exist today that offer cloud resources as a service and organizations often deploy applications within single cloud provider. The term CSP, or cloud service provider, may refer to an enterprise that provides Infrastructure as a Service such as compute, storage and network. CSPs may also provide higher-order services such as database, messaging, search, Machine Learning, CDN, data processing, etc. Organizations may face technical limitations when attempting to deploy applications across two or more different cloud service providers. For example, latency may be introduced for a variety of reasons, such as physical data center location, where disparate cloud regions are physically too far away from each other for low-latency distributed computing workloads. Databases required to adhere to standards, such as a requirement to have atomicity, consistency, isolation, durability (ACID) properties may not function, or may function sub-optimally, where latency exceeds a particular operating threshold. Moreover, addresses (e.g., source addresses) of containers within container groups located at one CSP may not be recognized using protocols of another CSP, thus causing dropped packets and lost data, also resulting in suboptimal or insufficient performance.

SUMMARY

Systems and methods are disclosed herein for a multi-cloud service system that establishes tunnels and network overlays across multiple CSPs while meeting a criterion for a latency threshold. The multi-cloud system may conduct latency benchmarking evaluation across each cloud region for multiple CSPs and the benchmarking evaluation results are saved in a datastore. Based on the latency bench marking evaluation results, the multi-cloud service system may identify a group of cloud regions that satisfy a criterion such as predetermined maximum latency threshold or geographical restriction. Based on information collected from the user, the multi-cloud service system may provision the group of cloud regions by first provisioning a tunnel between nodes of the multiple CSPs. The tunnel may be a VPN tunnel that enables packets to securely transfer between disparate CSPs over public network. The multi-cloud system may further establish an overlay network on top of the tunnel by encapsulating packets using encapsulation end point such as VTEP (VXLAN tunnel end point) over VXLAN (Virtual Extension Local Area Network). The establishment of the overlay network may comprise generating a routing table with static IPs of pods on each of the CSPs. The overlay network and encapsulation may help to ensure reliable transmission of packets from pod to pod. With an established tunnel and network overlay, the multi-cloud service system may inject user data into each node to initiate operations across the provisioned nodes using injected user data.

The disclosed systems and methods provide several advantageous technical improvements. For example, the disclosed systems and methods provide an improvement to latency issues when implementing Kubernetes clusters based on compute devices that exist in more than one CSPs. Each CSP may have multiple geographic locations (cloud regions) where physical data centers are deployed. The disclosed systems and methods decrease latency by conducting latency benchmarking and leverage cloud regions from multiple CSPs based on latency evaluation results to identify a group of cloud regions that satisfy a threshold latency requirement and/or geographical restriction. Further, the disclosed systems and methods connect disparate CSPs over an encrypted secure network without exposing applications or the underlying cloud service infrastructure to public IP routing for pod-to-pod communication. As a result, applications are not affected by the cloud that they are running as the systems and methods disclosed herein provide a platform that provides a seamless leveraging of multiple CSPs. Yet even more, the systems and methods disclosed herein provide a network overlay that encapsulates packets at a higher layer, which addresses the issue where pods from one CSP may not recognize pods from a disparate CSP due to different network addressing conventions and the destination cloud service may drop packets sourcing from another pod. The systems and methods disclosed herein help to ensure both reliability and security of communication in a multi-cloud network environment.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6 illustrates one embodiment of multiple exemplary user interfaces for collecting credentials for various CSPs.

DETAILED DESCRIPTION

Figure 1:
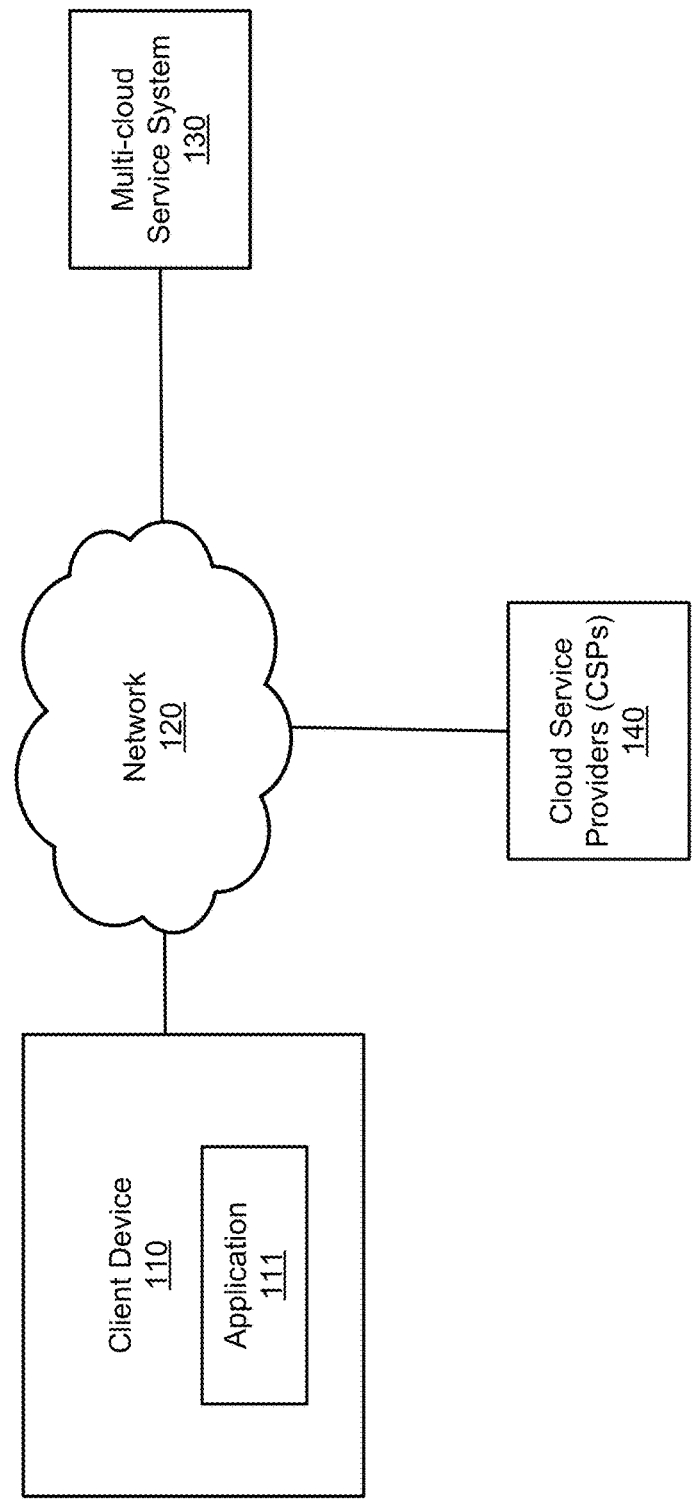
FIG. 1 illustrates one embodiment of a system environment including a multi-cloud service system 130 that executes workloads across multiple CSPs.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Cloud Service Introduction

The term CSP, as used herein, may refer to an enterprise that provides Infrastructure as a Service such as compute, storage and network. CSPs may also provide higher-order services such as database, messaging, search, Machine Learning, CDN, data processing, etc. Users may use the services provided by CSPs to execute workloads such as applications that run on a computer. For example, workloads may require storage and network capabilities from a CSP and may be executed across one or more CSPs using different resources available. A workload may be a traditional application hosted on a virtual machine (e.g. Cloud Provider Shape) or a Cloud Native container-based application. Each CSP may have multiple geographical locations where the physical data centers are deployed, and each such geographical location may be referred to as a cloud region for the CSP.

Within each CSP, multiple compute devices or nodes may run workloads. In some embodiments, workloads are organized into containers for execution. The term container, as used herein, may refer to an application footprint that includes the application and the required library dependencies to run. A container requires a container engine such a Docker to execute, where a Docker is a platform and tool for building, distributing, and running Docker containers. To manage and provision containerized workloads and services, the platform Kubernetes may be used to help facilitate both declarative configuration and automation. The term, Kubernetes, as used herein, is a portable, extensible, open-source platform for managing containerized workloads and services, that facilitates both declarative configuration and automation. For example, Kubernetes run workload by placing containers into pods to run on nodes, where a node may be a virtual or physical machine and a group of nodes may be referred to as a cluster.

In one embodiment, within a CSP, multiple compute devices may communicate with each other through a VCN (virtual cloud network), which is a virtual version of physical computer network that is created and utilized within a CSP. The VCNs provide private networking, public networking and support the common networking protocols such as TCP (Transmission Control Protocol) and UDP (User Datagram Protocol). Multiple compute devices containing pods may communicate with each other across multiple clouds as well, which is discussed in further details below.

Multi-Cloud Service System

Figure (FIG. 1 illustrates one embodiment of a system environment including a multi-cloud service system 130. As depicted in FIG. 1, environment 100 includes client device 110 having application 111 installed thereon, network 120, multi-cloud service system 130, and CSPs 140. Client device 110 may be any device operable by a user to interface with multi-cloud service system 130. Exemplary client devices include smartphones, tablets, and personal computers, though any client device capable of interfacing with a user in any manner described herein is a client device.

Application 111 may be a dedicated application provided (either directly, or indirectly (e.g., via an app store)) by multi-cloud service system 130, or may be an application accessed using a browser of client device 110 (e.g., hosted by one or more servers of multi-cloud service system 130). Application 111 may be used to output information to the user (e.g., via a display, speakers, etc.) and receive input from the user (e.g., via voice, keyboard, touchpad, or any other inputs). For example, application 111 may provide an interface to the user for collecting credentials that are used for provisioning a multi-cloud network. Further discussion of such functionality is described below with reference to FIGS. 5 and 6.

Network 120 may be any network capable of transmitting data communications between any entity shown in FIG. 1 or described herein. Exemplary networks that network 120 may embody include the Internet, a local area network (LAN), a wide area network (WAN), a VPN (virtual private network), a VCN (virtual cloud network), a VXLAN (virtual extension local area network), Wi-Fi, Bluetooth, and any other type of network.

Multi-cloud service system 130 performs functionalities for executing workloads across multiple CSPs while leveraging latencies between cloud regions. The multi-cloud service system 130 may evaluate cloud-to-cloud latencies and save the results in a database. Based on the evaluation results, multi-cloud service system 130 may identify a group of CSP cloud regions and create a multi-cloud region based on a threshold of latency. Once the multi-cloud regions are determined, the group of cloud regions can be provisioned (e.g. compute resources, network configuration, etc.) on behalf of a user based on credentials that the user provides through the application 111. The multi-cloud service system 130 may establish a tunnel between nodes of the multiple CSPs, for example, using a VPN for encryption and encapsulation that helps to ensure secure transmission of packets over public network. The multi-cloud service system 130 may further establish network overlay that encapsulates packets for transmitting packets from cloud service to pods or from pod to pod. The network overlay may be implemented through an encapsulation of VTEP (VXLAN tunnel end point) over VXLAN (virtual extension local area network). Finally, with an established pod-to-pod communication through VXLAN and VPN across multi-cloud regions, multi-cloud service system 130 may inject a set of user data into each node to begin operations. Functionalities associated with multi-cloud service system 130 are discussed in further details in accordance with FIG. 2.

Multi-Cloud Service System—Exemplary Architecture

Figure 2:
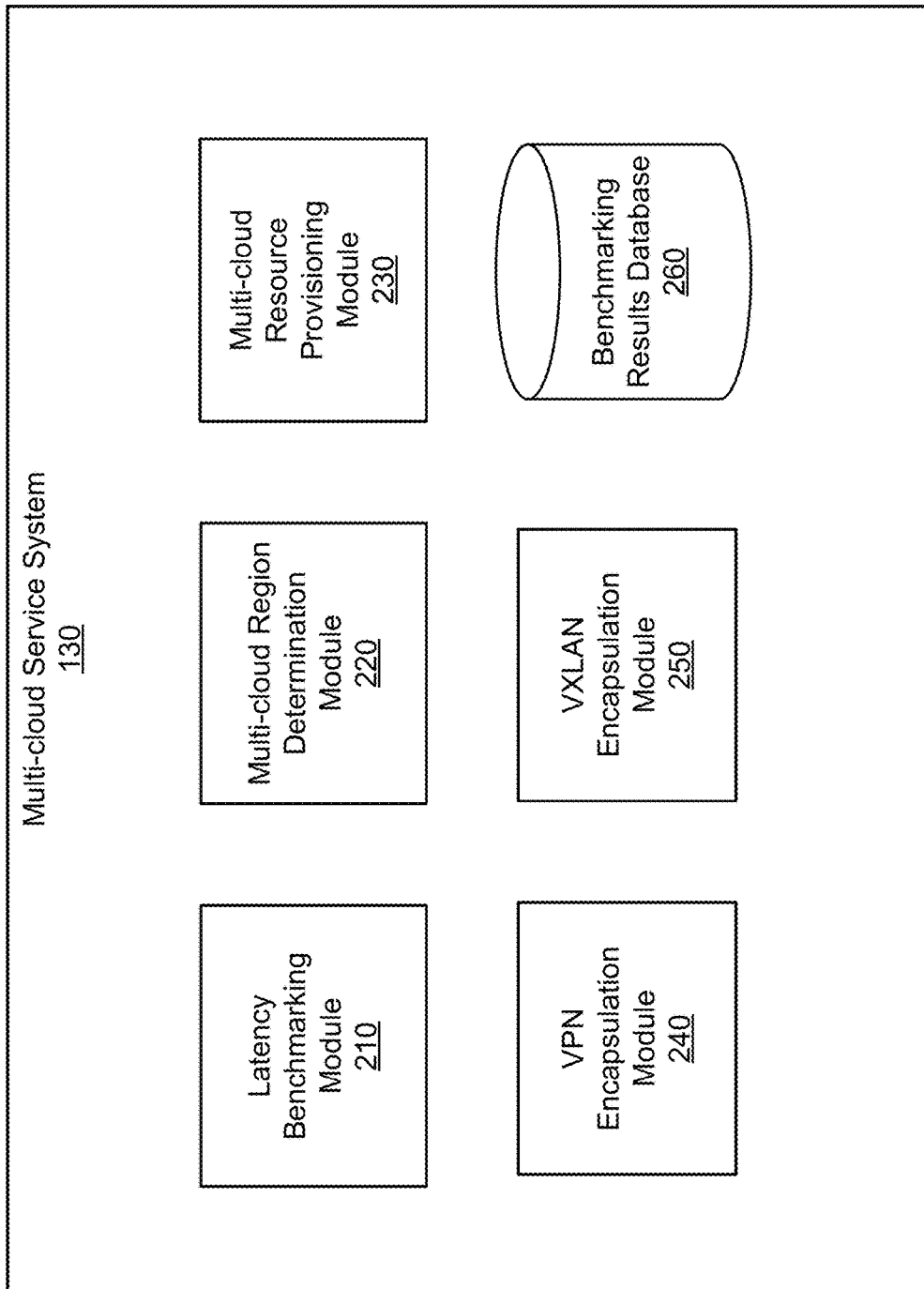
FIG. 2 illustrates one embodiment of exemplary modules included in the multi-cloud service system.

FIG. 2 illustrates one embodiment of exemplary modules and database used by the multi-cloud service system 130. As depicted in FIG. 2, multi-cloud service system 130 includes a latency benchmarking module 210 that enumerates latencies between cloud regions and stores the evaluation results in benchmarking results database 260, a multi-cloud region determination module 220 that determines a group of cloud regions based on a criterion, a multi-cloud resource provisioning module 230 that provisions a multi-cloud network and establishes tunnels for connections, a VPN encapsulation module 240 that encapsulates packets for transmitting over public network, and a VXLAN encapsulation module 150 that establishes a network overlay for transmitting packets from pod to pod or from cloud service to pod. The modules and databases shown in FIG. 2 are merely exemplary, and fewer or additional modules may be used to achieve the functionality disclosed herein. Moreover, some or all of the activity of multi-cloud service system 130 may be distributed to other devices (e.g., to application 111 of client device 110).

Latency benchmarking module 210 may enumerate all CSP cloud regions and for each region-to-region pair, the latency benchmarking module 210 determines an evaluation result and stores the results in the benchmarking results database 260. For example, each CSP may have physical data centers distributed across multiple geographic locations (e.g. cloud regions) and each cloud region may have its own public network connectivity characteristics. Latencies may vary for each region-to-region pair of cloud regions, and for each CSP region pair, latency benchmarking module 210 may deploy at least one compute instance and a performs network latency test with time bound to determine region-to-region latency. An end-to-end process for benchmarking region-to-region latency is further illustrated in FIG. 3.

Figure 3:
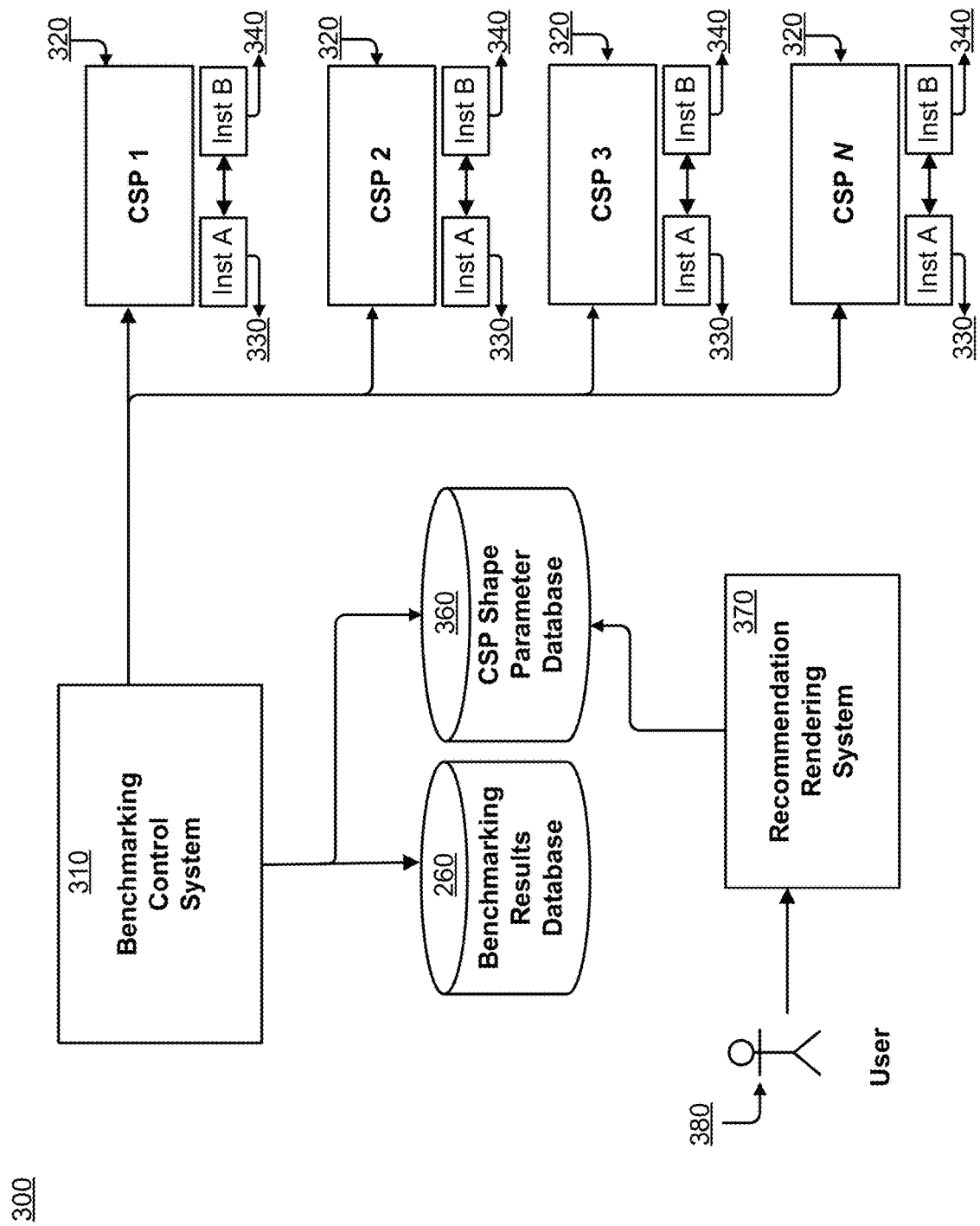
FIG. 3 illustrates one embodiment of an end-to-end system benchmarking region-to-region latency.

FIG. 3 illustrates one exemplary embodiment of an end-to-end system for implementing a process for evaluating benchmark latencies. Environment 300 includes a benchmarking control system 310, benchmarking results database 260, CSP shape parameter database 360, and recommendation rendering system 370. Benchmarking control system 310 may launch CSP instances on each CSP 320 and each launched instance 330 may be assigned a unique ID by the CSP 320 upon creation. The values of computed benchmarks for each instance 330 may be stored in the Benchmark Results Database 260. After benchmarking is complete, a user 380 may interface with recommendation rendering system 370 to request a recommendation of a cloud shape generated by the CSP shape parameter database 360. Further details related to benchmarking of various attributes of CSPs, including latency benchmarking, are disclosed in the U.S. patent application Ser. No. 17/321,856 filed on May 17, 2021, the disclosure of which is hereby incorporated by reference herein in its entirety. The latency benchmarking module 210 may generate a latency table based on the latency benchmarking evaluation results stored in the benchmarking results database 260. An exemplary latency table is illustrated in FIG. 4.

Figure 4:
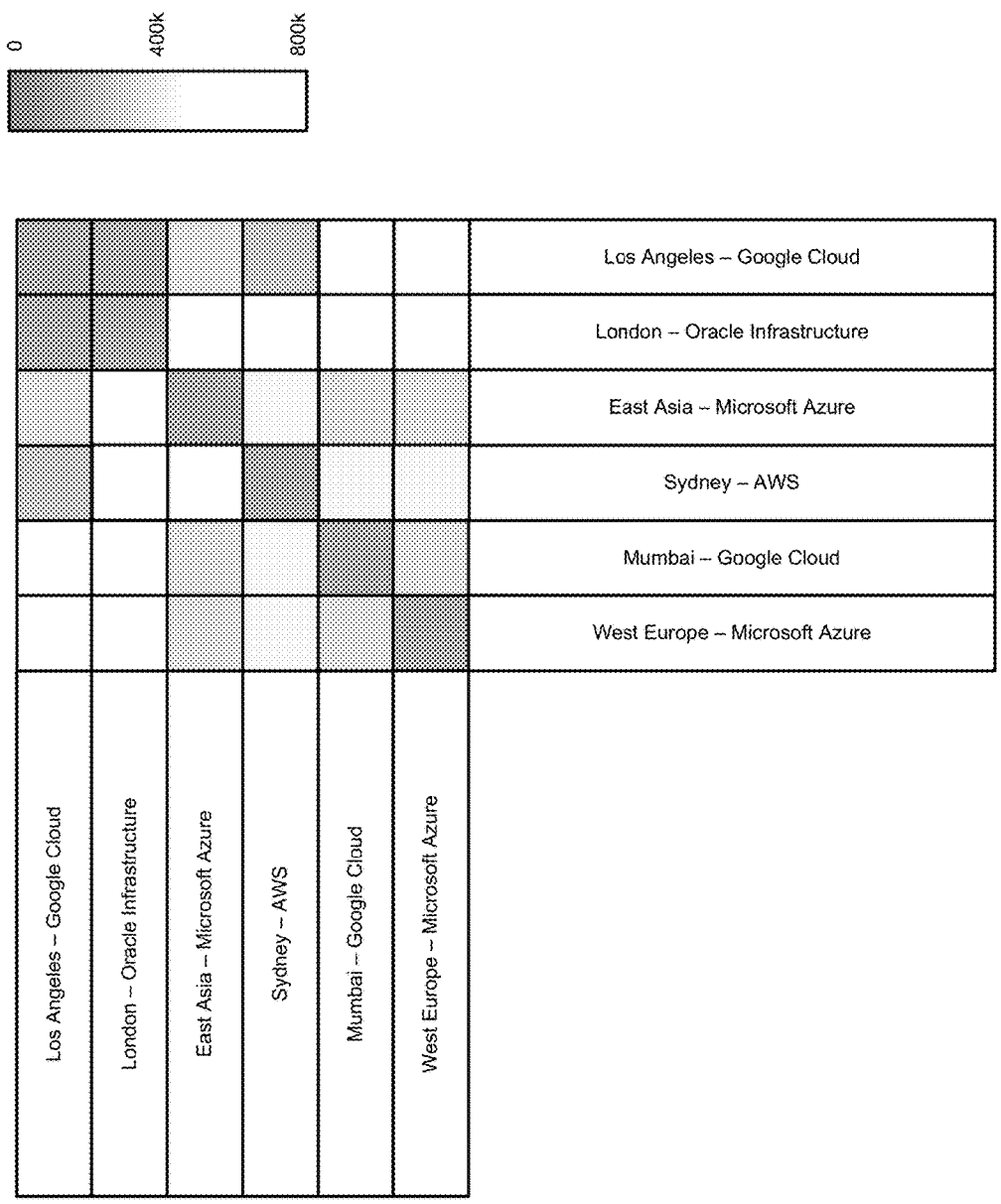
FIG. 4 illustrates one embodiment of an exemplary cloud-to-cloud latency map.

FIG. 4 illustrates one exemplary embodiment of a latency map with latency evaluation results for each region pair. As illustrated in FIG. 4, each CSP may have data centers located across different geographic locations and the latency results for each pair of regions may be different due to location, connectivity, or other network characteristics. In the exemplary latency table illustrated in FIG. 4, latencies between each region-to-region pair may be different. While only a limited number of such region pairs are shown in FIG. 4, a latency table may include additional latency benchmarking results for additional cloud regions provided by a variety of CSPs.

Continuing with the discussion of the modules in FIG. 2, multi-cloud region determination module 220 determines a group of cloud regions based on latency benchmarking results stored in the benchmarking results database 260 and further based on a criterion specified by the user. In one embodiment, the criterion may be a pre-determined latency threshold. Given an acceptable latency threshold, a list of CSP regions and their compatible grouping can be determined. For example, the latency threshold may be assumed (e.g. 5 milliseconds) to be the maximum tolerable latency threshold for a valid multi-cloud region. The latency threshold may also be provided through user input through applications 111. For example, a user may specify that 10 milliseconds is a reasonable latency threshold, and as a result, the multi-cloud region determination module 220 may determine to network together more CSP regions to create a multi-cloud region because 10 milliseconds is a larger tolerable latency threshold than 5 milliseconds. As a more concrete example, AWS, Google, Oracle and Azure Cloud may all have data centers located in Frankfurt Germany, that allow for a maximum latency equal to 5 milliseconds. A multi-cloud region can be defined as EU Central={AWS Frankfurt, GPC Frankfurt, Azure Frankfurt, Oracle Frankfurt}. Increasing the threshold will tend to increase the number of CSP's that can participate in a multi-cloud region. As an example, if the threshold=8 ms, several Amsterdam data centers may become eligible for the multi-cloud region.

In one embodiment, multi-cloud region determination module 220 may consider other factors in the multi-region grouping determination process. For example, data residency may be considered by using geographical boundaries. As an example, Toronto and Chicago may be acceptable from a latency perspective, however users may choose to keep all traffic and data within one sovereign border, such as within Canada, and as a result, cloud regions outside Canada are not selected for the multi-region group. With a selected multi-region group that meets the latency and/or geographic requirement, the multi-cloud region group may be presented for provisioning by the multi-cloud resource provisioning module 230.

Figure 5:
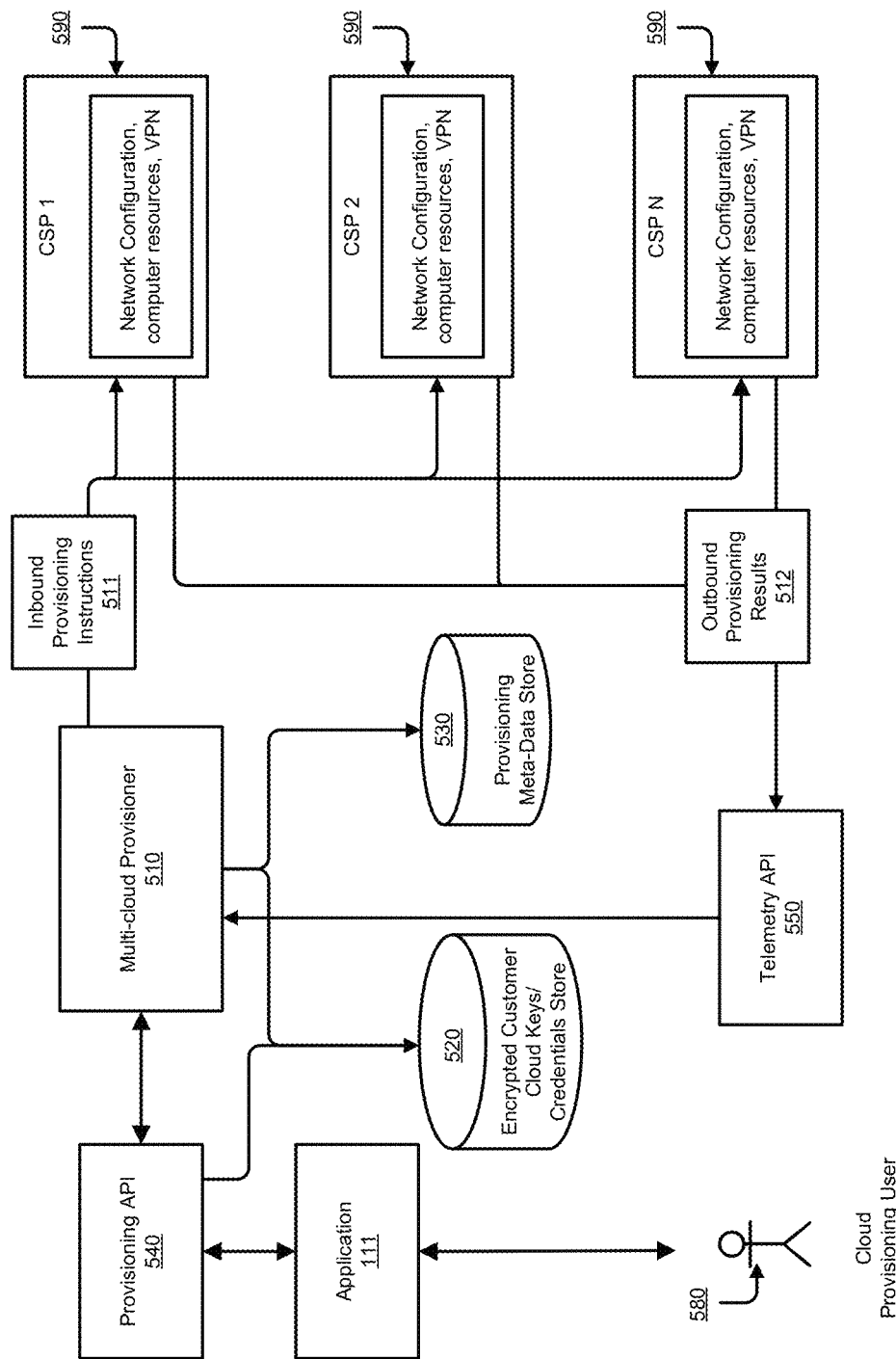
FIG. 5 illustrates one embodiment of an end-to-end system for provisioning a multi-cloud network.
Figure 6:
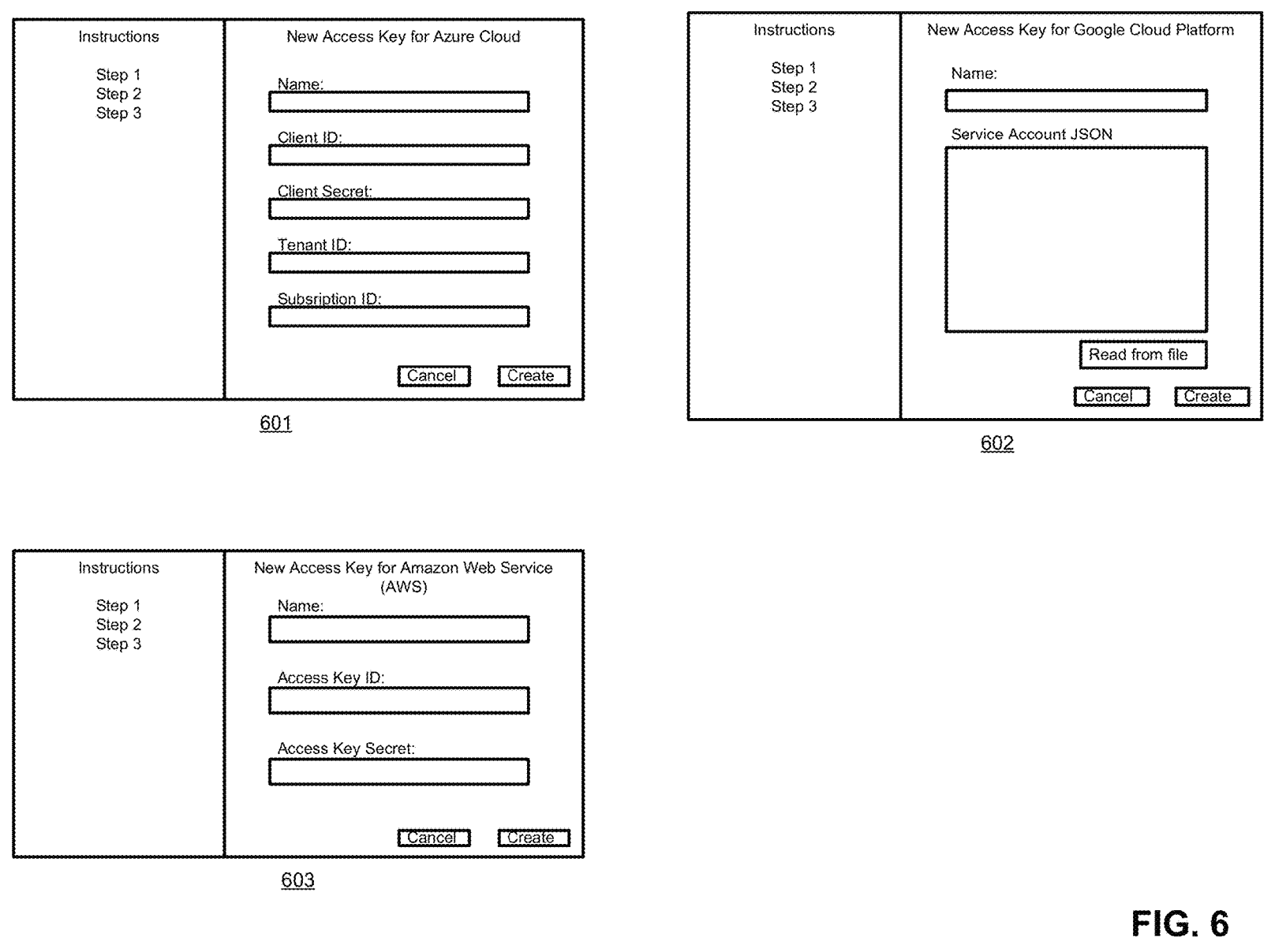

Multi-cloud resource provisioning module 230 may provision resources in the multi-cloud group based on user inputs received from the application 111. FIG. 5 illustrates one exemplary end-to-end process for provisioning CSP resources. The process may start with a cloud provisioning user 580 providing CSP credentials through the application 111. Each CSP may have a different mechanism for API authentication, and as a result, application 111 may provide instructions and details for creating and sharing of credentials in a secure manner according to the types of credentials required by each CSP. FIG. 6 illustrates three exemplary user interfaces for user 580 to input credentials, where interfaces 601, 602, and 603 are exemplary user interfaces for collecting credentials for Azure Cloud, Google Cloud Platform, and Amazon Web Service, respectively. As illustrated in FIG. 6, the interface for each CSP may be different from each other based on the type of credentials required.

Continuing with the process in FIG. 5, the collected credentials may be passed to provisioning API 540, where API calls may be sent to the encrypted customer cloud keys/credential store 520 where the credentials may be further encrypted and stored. The provisioning API 540 may also send API calls to multi-cloud provisioner 510, which may further send inbound provisioning instructions 511 to CPSs 590 for provisioning resources such as network configuration, computer resources, and VPN, etc. In one embodiment, inbound provisioning instructions 511 may include instructions for provisioning a tunnel, such as a VPN tunnel for communication between CSPs over public network and provisioning a network overlay for encapsulation packets for pod-to-pod communication. Functionalities related to tunnel and network overlay provisioning are further discussed in accordance with the VPN encapsulation module 240 and the VXLAN encapsulation module 250. Errors generated during the provisioning process may be sent back through outbound provisioning results 512 to telemetry API 550, who may further send API calls to the multi-cloud provisioner 510 and the outbound provisioning results 512 are saved to provisioning meta-data store 530.

Continuing with the modules in FIG. 2, a VPN encapsulation module 240 encapsulates packets for transmission through public network. A virtual private network (VPN) extends a private network across a public network and enables users to send and receive data across shared or public networks as if the computing devices are directly connected to the private network. Applications running across a VPN may therefore benefit from the functionality, security, and management of the private network. Therefore, multi-cloud service system 130 may use a VPN for communication between CSPs. The disparate CSPs are connected together over an encrypted secure network, without exposing applications or the underlying infrastructure to public IP routing for pod-to-pod and pod-to-service communication. VPN encapsulation module 240 may encapsulate packets using encryption and authentication schemes. For example, some of the common encryption and authentication schemes are IPSec, OpenVPN, WireGuard, etc. Most popular VPN implementations available on CSPs are based on the IPsec protocol suite. The Main IPSec components include: Authentication Headers (AH), Encapsulating Security Payloads (ESP) and Security Associations (SA). The functionalities of VPN encapsulation are discussed further below in accordance with FIGS. 7-9.

A VXLAN encapsulation module 250 establishes a network overlay that encapsulates a packet using VTEP (VXLAN Tunnel End Point). The VXLAN encapsulation module 250 encapsulates a packet (e.g. L2 frame packet) for transmitting packets from service to pod or from pod to pod. While VXLAN is used as an example here as one way for encapsulation, other methods of encapsulation may also be used for establishing the network overlay such that a cloud service or compute device recognizes the CIDR (classes inter-domain routing) of a packet for a pod. The functionalities of VXLAN encapsulation module 250 are discussed further below in accordance with FIGS. 10-11.

Figure 7:
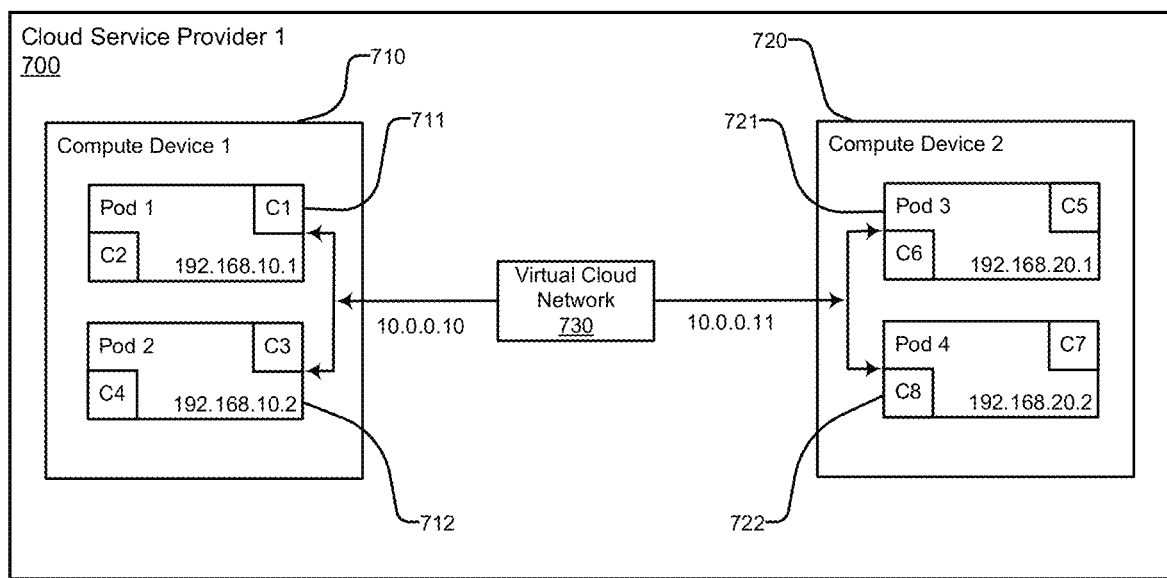
FIG. 7 is a block diagram illustrating an exemplary system including a VCN (virtual cloud network) connecting multiple pods within a single CSP.

To illustrate the communication across a multi-cloud network connected through VPN and VXLAN tunnels, the discussion begins with an exemplary single-CSP embodiment for context. FIG. 7 illustrates an exemplary CSP 700 with two compute devices 710 and 720. Each compute device has two (Kubernetes) Pods 711 and 712, 721 and 722, respectively, and each pod further includes two containers (e.g. containers C1-C8). The elements included in FIG. 7 are for illustration purposes only, and a network may contain more compute devices, pods or containers. The two computing devices are connected through a virtual cloud network 730 and can communicate freely across allowed network protocols and ports. Each compute device has a private IP address, such as "10.0.0.10" for compute device1 710 and "10.0.0.11" for compute device2 720. Within each compute device, pods on the same compute device may be able to communicate with each other using a private IP address associated with each pod. For example, in FIG. 7, pod 1 is associated with a private IP address "192.168.10.1" and pod 2 is associated with a private IP address "192.168.10.2." In one embodiment, pods that need to communicate with one another across a Virtual Cloud Network 730 are routed through the computing device host. For example, for pod 1 711 to communicate with pod 4 722, packets must be routed through the following network path: 192.168.10.1 (source)→10.0.0.10→10.0.0.11→192.168.20.2 (destination). As the pods are run within a same cloud service provider environment, the Kubernetes platform may ensure that all static routes are created on each worker node such that each node is aware of the pod network CIDRs and how to route to those CIDRs appropriately.

Figure 8:
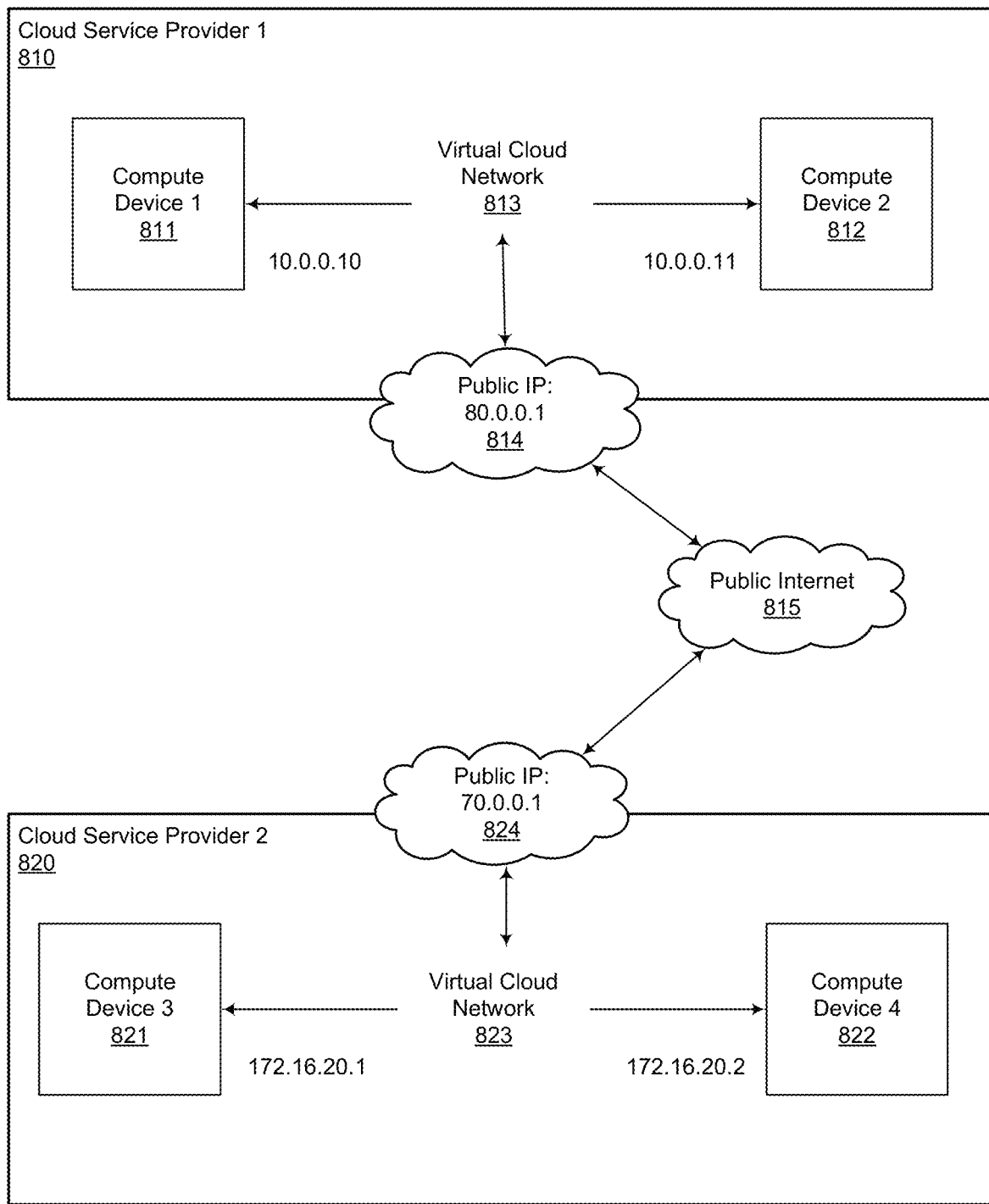
FIG. 8 is a block diagram illustrating an exemplary system that connects multiple CSPs through public network using a VPN (virtual private network).

Expanding the discussion to communication between multiple CSPs, FIG. 8 illustrates two CSP's 810 and 820 connected using VPN through a public internet 815. Each CSP is associated with a public IP address, such as "80.0.0.1" for VPN gateway 814 for CSP1 and "70.0.0.1" for VPN gateway 824 for CSP2. The two disparate CSPs are connected through VPN tunnels over CSP provided VPN services. Each CSP 810 and CSP 820 may include multiple compute devices connected through a virtual cloud network such as 813 and 823. Packets are encrypted and routed through VPN over the public internet 815. Each Virtual Cloud Network knows about its peered private network(s) through routing table entries that are injected as static routes into each CSP Virtual Network. For example, if compute device 1 811 ("10.0.0.10") wants to communicate with compute device 4 ("172.16.20.2") the packet will be routed statically to the VPN gateway located on CSP1. The VPN tunnel will then transport the encapsulated and encrypted packet over the public internet gateways (80.0.0.1 and 70.0.0.1). The receiving VPN endpoint will unpack the packet and deliver it to compute device 4.

Figure 9:
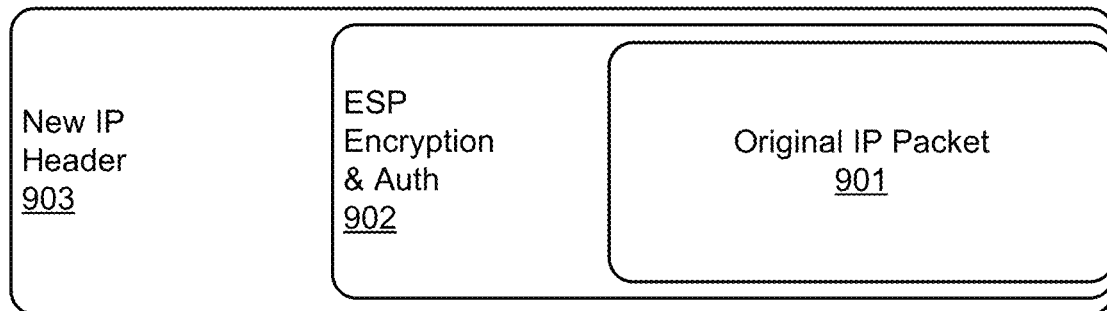
FIG. 9 illustrates one embodiment of an exemplary structure of VPN encapsulation.

FIG. 9 illustrates one exemplary embodiment of VPN encapsulation. VPN encapsulation module may encrypt the original IP packet 901 with ESP Encryption and Authentication 902, which may include ESP header, ESP trailer and ESP Authentication trailer. The encrypted packet may be further encapsulated with a new IP header 903 which is a public IP header for transmission over public network. The exemplary encapsulation structure in FIG. 9 is one example for encrypting and encapsulating a packet and other encryption and encapsulation schemes may be used.

Figure 10:
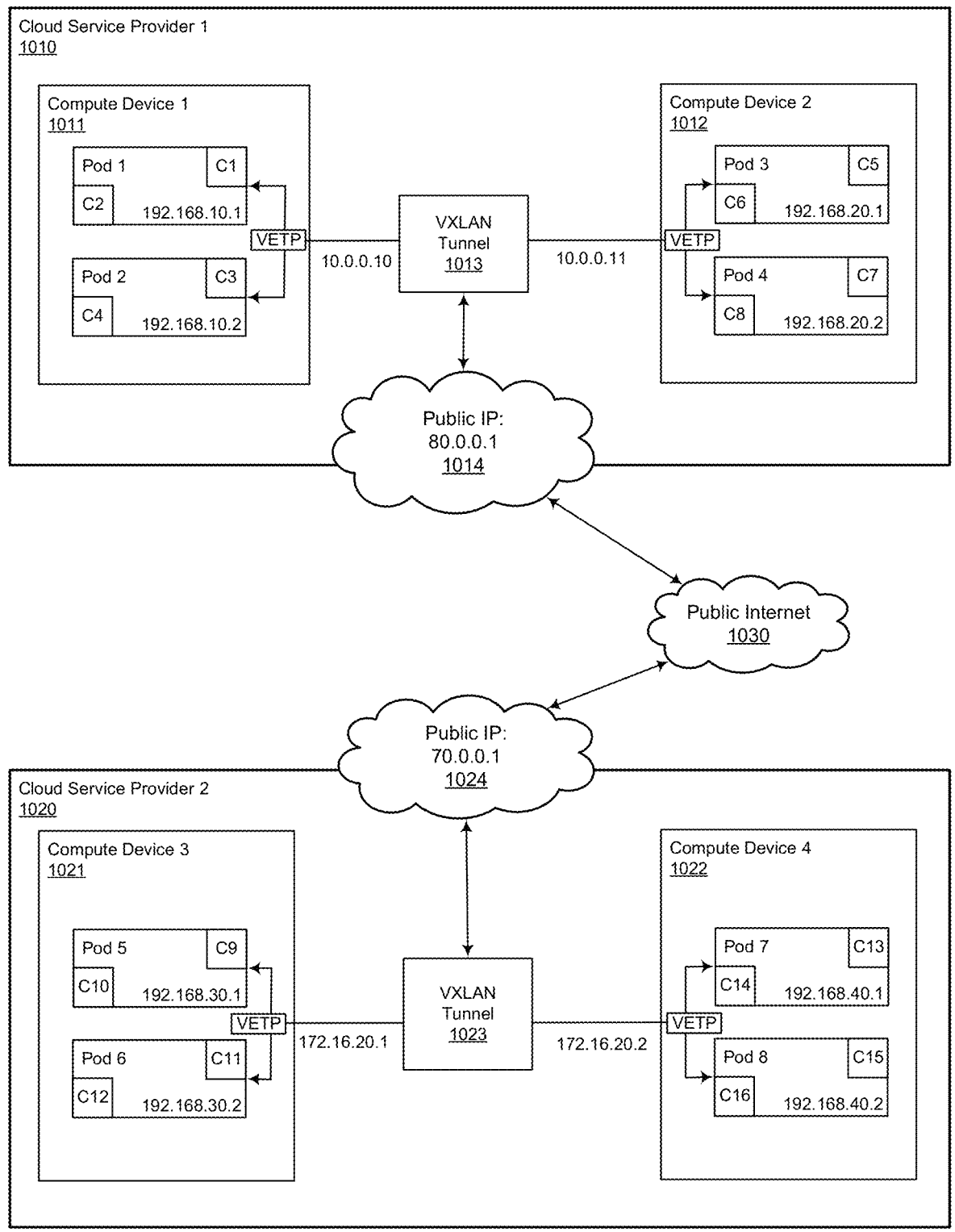
FIG. 10 is a block diagram illustrating an exemplary system that connects multiple CSPs through a VPN (virtual private network) and VXLAN (virtual extensible local area network).

FIG. 10 illustrates one embodiment where two disparate CSPs may communicate through a tunnel encapsulated by VXLAN for packet transmission. FIG. 10 depicts a constructed multi-cloud network consisting of multiple compute devices 1011, 1012, 1021 and 1022, deployed in multiple clouds (e.g. CSP1 1010 and CSP2 1020). Because the Kubernetes platform may add an additional subnet scheme for pod-to-pod and pod-to-service communication, each pod within a compute device may have its own IP address from a separate CIDR block that the CSP may not be aware of. For example, in FIG. 10, the pod-to-pod communication through the path pod 1 "192.168.10.1" (Source)→ 10.0.0.10→10.0.0.11→pod 4 "192.168.20.2". In this case, CSP2 1020 does not understand the source IP 192.168.10.0/ 24 and the destination cloud (e.g. Azure Cloud Regions) may drop the packet sourcing from Pod 1 believing that the packet is malformed. In response to these security measures that prevent a valid multi-cloud use-case, packets may be further encapsulated to prevent packets from being dropped by the destination cloud. To achieve this, multi-cloud service module 130 may establish a network overlay that encapsulates packets. In one embodiment, VXLAN may be used as a method for encapsulation for its performance characteristics and embedded Linux support. In FIG. 10, each compute device includes multiple pods and communication path for inter-node, inter-cloud and cross-cloud communication. For example, in the network path for pod 1 ("192.168.10.1") to communicate with pod 8 ("192.168.40.2"), pod 1 may initiate a connection destined for pod 8 in compute device 4 1022. The packet is encapsulated by the compute device 1 VTEP. The compute device 1 determines that the VXLAN encapsulated packet should be destined for compute device 4 ("172.16.20.2"). As a result, the VTEP sends a VXLAN embedded packet (e.g. UDP packet) to the VPN service based on the previously established routing table. The VPN service then further encapsulates and encrypts the UDP packet and sends it from 80.0.0.1→70.0.0.1 (across cloud, over public internet 1030). The UDP packet is then delivered to compute device 4. The VTEP finally de-encapsulates the packet and delivers a packet (e.g. HTTPS/TCP packet) to pod 8 (192.168.40.2).

Figure 11:
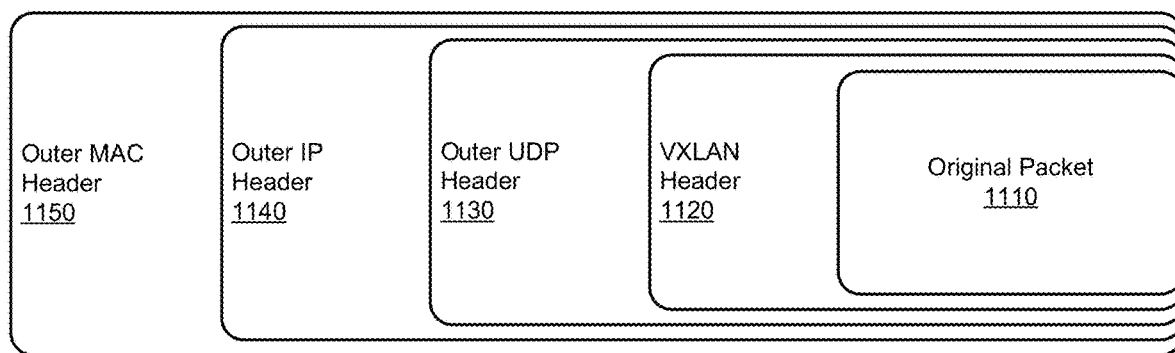
FIG. 11 illustrates one embodiment of an exemplary structure of VXLAN encapsulation.

FIG. 11 illustrates an exemplary packet encapsulation scheme of VXLAN encapsulation. In one embodiment, VXLAN may wrap the original packet 1110 into additional 50-70 bytes of headers (e.g. metadata) including VXLAN header 1120, Outer UDP header 1130, Outer IP header 1140, and outer MAC (Media Access Control) header. Each header may include different information such as source address, destination address, and port information for transmitting packets. For example, a UDP header may include data fields such as source port number, the destination port number, the length of the data field, and the checksum field, and a MAC header may include data fields added at the beginning of a network packet in order to turn it into a frame (such as an Ethernet header) to be transmitted. The exemplary encapsulation structure in FIG. 11 is one example for encapsulating a packet and other encapsulation schemes may be used.

Figure 12:
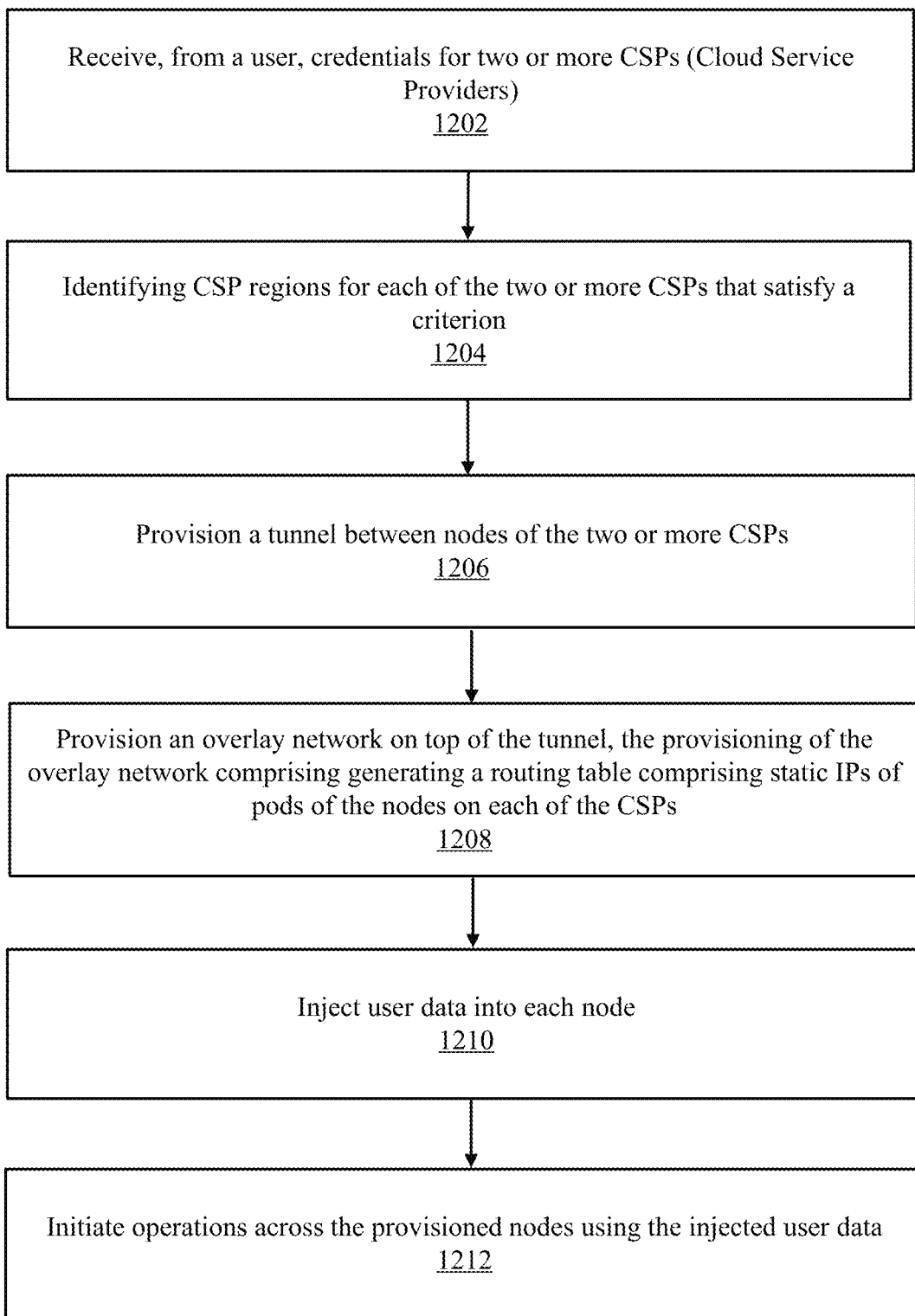
FIG. 12 illustrates one embodiment of an exemplary process for executing workloads across multiple CSPs.

FIG. 12 illustrates an exemplary process for executing workloads over multiple CSPs. The process 300 starts with receiving 1202 credentials for two or more CSPs from the user. The credentials may be received from the application 111 (e.g. a web application with user interface.) The multi-cloud region determination module 220 may identify 1204 regions for each of the two or more CSPs that satisfy a criterion such as a predetermined maximum latency threshold. The group of regions may be identified based on latency benchmarking results evaluated by the latency benchmarking module 210. With a group of regions identified that satisfy the latency threshold, the multi-cloud resource provisioning module 230 may provision 1206 a tunnel (e.g. VPN tunnel) between nodes of the two or more CSPs. The multi-cloud resource provisioning module 230 may further provision 1206 an overlay network (e.g. VXLAN encapsulation) on top of the tunnel by generating a routing table comprising static IPs of pods of the nodes on each of the CSPs. The collected user data (e.g. tokens, certificates, IP addresses and other operating details) are injected 1210 into each node and operations across the provisioned nodes may be initiated 1212 using the injected user data.

Figure 13:
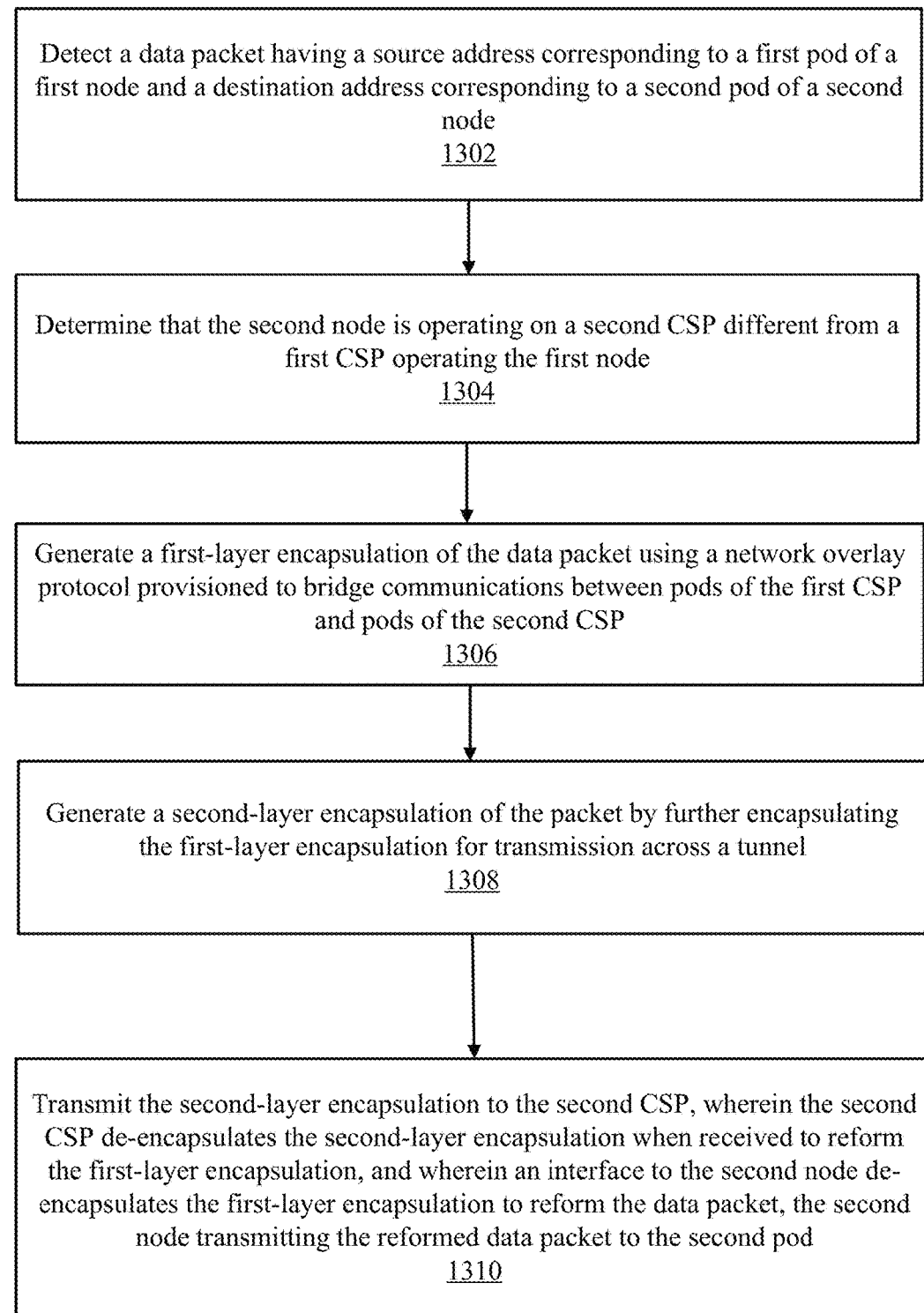
FIG. 13 illustrates one embodiment of another exemplary process for executing workloads across multiple CSPs.

FIG. 13 illustrates an exemplary process for executing multiple workloads over CSPs. The process 1300 starts with the multi-cloud service system 130 detecting 1302 a data packet having a source address corresponding to a first pod of a first node and a destination address corresponding to a second pod of a second node. The multi-cloud service system 130 may further determine 1304 that the second node is operating on a second CSP that is different from a first CSP operating the first node. The multi-cloud service system 130 may generate a first-layer encapsulation of the data packet using a network overlay protocol (such as VXLAN encapsulation) provisioned to bridge communications between pods of the first CSP and pods of the second CSP. A second-layer encapsulation of the packet may be generated by further encapsulating the first-layer encapsulation for transmission across a tunnel (e.g. VPN tunnel). The second-layer encapsulation is transmitted 1310 to the second CSP (e.g. destination CSP) where the second-layer encapsulation is de-encapsulated by the second CSP to reform the first-layer encapsulation. An interface to the second node may further de-encapsulate the first-layer encapsulation to reform the data packet and the second node may transmit the reformed data packet to the second pod.

Computing Machine Architecture

Figure 14:
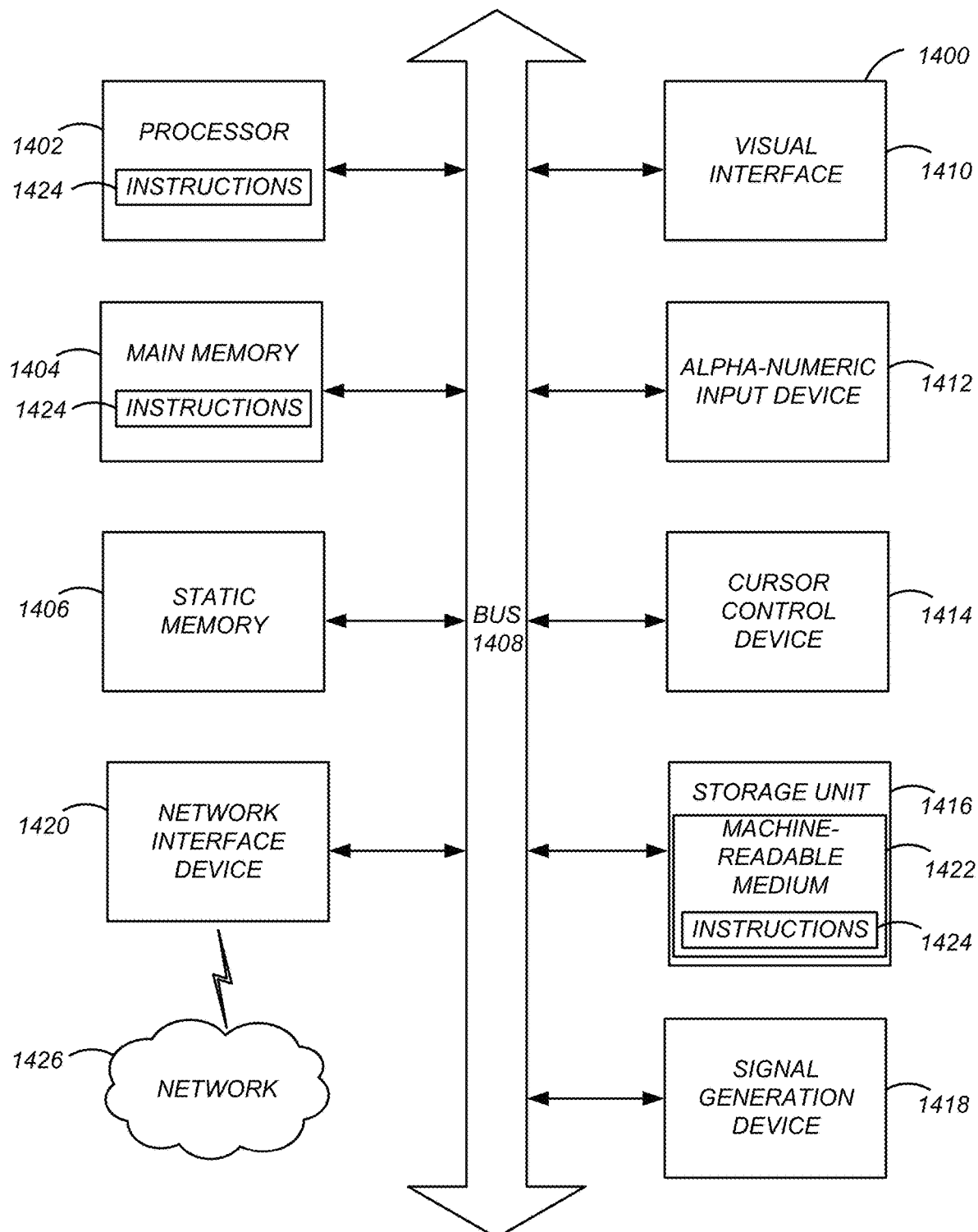
FIG. 14 illustrates one embodiment of an exemplary computer architecture.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which program code (e.g., software) for causing the machine to perform any one or more of the methodologies discussed herein may be executed. The program code may be comprised of instructions 1424 executable by one or more processors 1402. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include visual display interface 1410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1410 may include or may interface with a touch enabled screen. The computer system 1400 may also include alpha-numeric input device 1412 (e.g., a keyboard or touch screen keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for benchmarking, grouping, and recommending CSP shapes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory machine-readable medium comprising memory with instructions encoded thereon for routing data between pods on disparate cloud service providers (CSPs), the instructions causing one or more processors to perform operations when executed, the instructions comprising instructions to:
    detect a data packet having a source address that is a first private address corresponding to a first Kubernetes pod of a first node and a destination address that is a second private address corresponding to a second Kubernetes pod of a second node, the first node having a first node address that is a first public address and that is different from the source address corresponding to the first Kubernetes pod, the second node having a second node address that is a second public address that is virtual and is different from the destination address corresponding to the second Kubernetes pod;
    determine that the second node is operating on a second CSP different from a first CSP operating the first node;
    responsive to determining that the second node is operating on the second CSP different from the first CSP operating the first node, generate a first-layer encapsulation of the data packet using a network overlay protocol provisioned to bridge communications between private addresses of Kubernetes pods of the first CSP and private addresses of Kubernetes pods of the second CSP, the first-layer encapsulation of the data packet addressed to the second node address that is virtual and that is different from the destination address corresponding to the second Kubernetes pod and encapsulating the destination address corresponding to the second Kubernetes pod;
    generate a second-layer encapsulation of the packet by further encapsulating the first-layer encapsulation for transmission across a tunnel, wherein the tunnel is a virtual private network (VPN) between the first CSP and the second CSP; and transmit the second-layer encapsulation to the second CSP, wherein the second CSP de-encapsulates the second-layer encapsulation when received to reform the first-layer encapsulation and transmit the first-layer encapsulation to the second node, and wherein an interface to the second node de-encapsulates the first-layer encapsulation to reform the data packet, the second node transmitting the reformed data packet to the second Kubernetes pod.

2. The non-transitory machine-readable medium of claim 1, wherein the first node comprises a plurality of pods including the first Kubernetes pod, and wherein the plurality of pods has a common private addressing scheme with the first node.

3. The non-transitory machine-readable medium of claim 2, wherein the second Kubernetes pod has a different private addressing scheme from the common private addressing scheme.

4. The non-transitory machine-readable medium of claim 3, wherein the first-layer encapsulation comprises adding metadata to the packet comprising information sufficient to translate the common private addressing scheme to the different private addressing scheme.

5. The non-transitory machine-readable medium of claim 4, wherein generating the second-layer encapsulation comprises adding further metadata to the packet comprising information to transmit the packet from the first CSP to the second CSP across a public network.

6. The non-transitory machine-readable medium of claim 1, wherein, responsive to de-encapsulating the second-layer encapsulation, the second CSP determines, based on the first-layer encapsulation, that the packet is addressed to a Kubernetes pod of the second node.

7. A method for routing data between pods on disparate cloud service providers (CSPs) comprising:

detecting a data packet having a source address that is a first private address corresponding to a first Kubernetes pod of a first node and a destination address that is a second private address corresponding to a second Kubernetes pod of a second node, the first node having a first node address that is a first public address and that is different from the source address corresponding to the first Kubernetes pod, the second node having a second node address that is a second public address that is virtual and is different from the destination address corresponding to the second Kubernetes pod;

determining that the second node is operating on a second CSP different from a first CSP operating the first node;

responsive to determining that the second node is operating on the second CSP different from the first CSP operating the first node, generating a first-layer encapsulation of the data packet using a network overlay protocol provisioned to bridge communications between private addresses of Kubernetes pods of the first CSP and private addresses of Kubernetes pods of the second CSP, the first-layer encapsulation of the data packet addressed to the second node address that is virtual and that is different from the destination address corresponding to the second Kubernetes pod and encapsulating the destination address corresponding to the second Kubernetes pod;

generating a second-layer encapsulation of the packet by further encapsulating the first-layer encapsulation for transmission across a tunnel, wherein the tunnel is a virtual private network (VPN) between the first CSP and the second CSP; and transmitting the second-layer encapsulation to the second CSP, wherein the second CSP de-encapsulates the second-layer encapsulation when received to reform the first-layer encapsulation and transmit the first-layer encapsulation to the second node, and wherein an interface to the second node de-encapsulates the first-layer encapsulation to reform the data packet, the second node transmitting the reformed data packet to the second Kubernetes pod.

8. The method of claim 7, wherein the first node comprises a plurality of pods including the first Kubernetes pod, and wherein the plurality of pods has a common private addressing scheme with the first node.

9. The method of claim 8, wherein the second Kubernetes pod has a different private addressing scheme from the common private addressing scheme.

10. The method of claim 9, wherein the first-layer encapsulation comprises adding metadata to the packet comprising information sufficient to translate the common private addressing scheme to the different private addressing scheme.

11. The method of claim 10, wherein generating the second-layer encapsulation comprises adding further metadata to the packet comprising information to transmit the packet from the first CSP to the second CSP across a public network.

12. The method of claim 7, wherein, responsive to de-encapsulating the second-layer encapsulation, the second CSP determines based on the first-layer encapsulation that the packet is addressed to a Kubernetes pod of the second node.

13. The method of claim 7, wherein generating the first-layer encapsulation and generating the second-layer encapsulation both occur responsive to determining that the second node is operating on a second CSP different from a first CSP operating the first node.

14. The method of claim 7, wherein the first-layer encapsulation comprises address information for the pods of the first CSP and the pods of the second CSP.

15. A system comprising:

a processor; and a non-transitory computer-readable storage medium storing instructions for routing data between pods on disparate cloud service providers (CSPs), the instructions when executed by the processor cause the processor to perform steps comprising:

detecting a data packet having a source address that is a first private address corresponding to a first Kubernetes pod of a first node and a destination address that is a second private address corresponding to a second Kubernetes pod of a second node, the first node having a first node address that is a first public address and that is different from the source address corresponding to the first Kubernetes pod, the second node having a second node address that is a second public address that is virtual and is different from the destination address corresponding to the second Kubernetes pod;

determining that the second node is operating on a second CSP different from a first CSP operating the first node;

responsive to determining that the second node is operating on the second CSP different from the first CSP operating the first node, generating a first-layer encapsulation of the data packet using a network overlay protocol provisioned to bridge communications between private addresses of Kubernetes pods of the first CSP and private addresses of Kubernetes pods of the second CSP, the first-layer encapsulation of the data packet addressed to the second node address that is virtual and that is different from the destination address corresponding to the second Kubernetes pod and encapsulating the destination address corresponding to the second Kubernetes pod;

generating a second-layer encapsulation of the packet by further encapsulating the first-layer encapsulation for transmission across a tunnel, wherein the tunnel is a virtual private network (VPN) between the first CSP and the second CSP; and transmitting the second-layer encapsulation to the second CSP, wherein the second CSP de-encapsulates the second-layer encapsulation when received to reform the first-layer encapsulation and transmit the first-layer encapsulation to the second node, and wherein an interface to the second node de-encapsulates the first-layer encapsulation to reform the data packet, the second node transmitting the reformed data packet to the second Kubernetes pod.

16. The system of claim 15, wherein the first node comprises a plurality of pods including the first Kubernetes pod, and wherein the plurality of pods has a common private addressing scheme with the first node.

17. The system of claim 16, wherein the second Kubernetes pod has a different private addressing scheme from the common private addressing scheme.

18. The system of claim 17, wherein the first-layer encapsulation comprises adding metadata to the packet comprising information sufficient to translate the common private addressing scheme to the different private addressing scheme.

19. The system of claim 18, wherein generating the second-layer encapsulation comprises adding further metadata to the packet comprising information to transmit the packet from the first CSP to the second CSP across a public network.

20. The system of claim 15, wherein, responsive to de-encapsulating the second-layer encapsulation, the second CSP determines based on the first-layer encapsulation that the packet is addressed to a Kubernetes pod of the second node.

* * * * *